United States Patent [19]

Okano et al.

[11] Patent Number: 4,629,299
[45] Date of Patent: Dec. 16, 1986

[54] MICROFORM-READER

[75] Inventors: Takeshi Okano, Nishinomiya; Sadaaki Nakaoka, Osaka; Saichiro Ohashi, Otokuni, all of Japan

[73] Assignee: Fuji Photo Film Co., Ltd., Kanagawa, Japan

[21] Appl. No.: 769,917

[22] Filed: Aug. 27, 1985

[30] Foreign Application Priority Data

Aug. 28, 1984 [JP] Japan .......................... 59-131160[U]

[51] Int. Cl.⁴ ............................................. G03B 21/10
[52] U.S. Cl. ......................................... 353/97; 353/79
[58] Field of Search .................... 353/79, 80, 97, 119, 353/75, 78, 72

[56] References Cited

U.S. PATENT DOCUMENTS

| | | | |
|---|---|---|---|
| 2,769,368 | 11/1956 | Bearint | 353/72 |
| 4,092,064 | 5/1978 | Puel | 353/79 |
| 4,170,408 | 10/1979 | Behr | 353/72 |

FOREIGN PATENT DOCUMENTS 3050463  7/1983  Fed. Rep. of Germany ........ 353/79

*Primary Examiner*—Harry N. Haroian
*Attorney, Agent, or Firm*—Sughrue, Mion, Zinn Macpeak & Seas

[57] ABSTRACT

A microform-reader which comprises a generally rectangular box-like, flattened casing a slide frame slidably supported by the casing for movement between retracted and extended positions, a light-permeable screen mounted on and supported by the casing for movement between folded and erected positions, and a reflective mirror member carried by the slide frame for movement between laid-down and upright positions. When the microform-reader is not in use with the slide frame, the screen and the mirror member being held in the retracted, folded and laid-down positions, respectively, the screen and the mirror member constitute cover members for covering the top and bottom of a space between the casing and the slide frame, but when the microform-reader is in use with the slide frame, the screen and the mirror member held in the extended, erected and upright positions, respectively, the mirror member confronts the screen at a predetermined angle while lying in a plane different from the plane which is occupied by the mirror member when in the laid-down position. The microform-reader also comprises a foldable light-shielding hood for intercepting the entry of external light into the optical path particularly between the reflecting mirror and the screen.

2 Claims, 9 Drawing Figures

MICROFORM-READER

BACKGROUND OF THE INVENTION

The present invention relates to a microform-reader for projecting images of information, such as alpha-numeric characters and/or graphs, recorded on a microfilm, onto a self-contained viewing screen.

It is largely recognized that the space for the storage of a huge number of documents can advantageously be minimized if the documents are microfilmed. Therefore, in most offices or any other establishments where a large number of documents are handled, a microfilming system is employed. Because the microfilming system is effective to speed up the office documentation and also effective to provide the reproduction of clear images, the microfilming system has gained the lead far ahead of the other recording media.

In such a microfilming system, a device generally called a microform-reader has to be used for reproducing and viewing an image recorded on a microfilm. As is well known to those skilled in the art, the microform-reader requires the provision of an optical system for enlarging each frame of the microfilm to a size corresponding usually to a A-4 sized paper. The provision of such an optical system has long made the microform-reader considerably bulky and large in size and, therefore, the place of installation of the microform-reader has been fixed or limited thereby posing such a problem that it could not have been readily available for use.

In view of the foregoing, the inventors of the present invention have successfully devised a compact, foldable microform-reader which is disclosed in their U.S. patent application Ser. No. 700,157, filed Feb. 11, 1985, and assigned to the same assignee of the instant application. The microform-reader disclosed therein comprises a generally rectangular box-like, flattened casing; a movable member supported by the casing for movement between retracted and extended positions in a direction parallel to any one of the opposite side walls of the casing; a viewing screen mounted on and supported by the casing for movement between folded and uprisen positions; an optical system for projecting the image onto the screen; a lamp for illuminating the image on the screen; a reflecting mirror member supported for movement between laid-down and upright positions; and a foldable light shield provided for enclosing a space defined between the screen and the mirror member when said screen and said mirror member are held in the uprisen position and the upright positions, respectively. The light shield comprises a top panel hingedly connected to the top of the screen and has its opposite sides hingedly connected with respective side panels, said top and side panels capable of being folded together about the respective hinges.

This microform-reader is satisfactory in many respects, but it has been found that the foldable light shield used therein is somewhat awkward and inconvenient to handle particularly where it is desired to be folded down.

SUMMARY OF THE INVENTION

The present invention has been developed with a view to substantially eliminating the above discussed inconveniences and for its essential object to provide a microform-reader having a foldable light-shielding hood capable of being automatically folded and unfolded in response to the closure and opening of a hingedly supported top cover member.

BRIEF DESCRIPTION OF THE DRAWINGS

This and other objects and features of the present invention will become readily understood from the following description taken in conjunction with a preferred embodiment thereof with reference to the accompanying drawings, in which.

DETAILED DESCRIPTION OF THE EMBODIMENT

Figure 1:
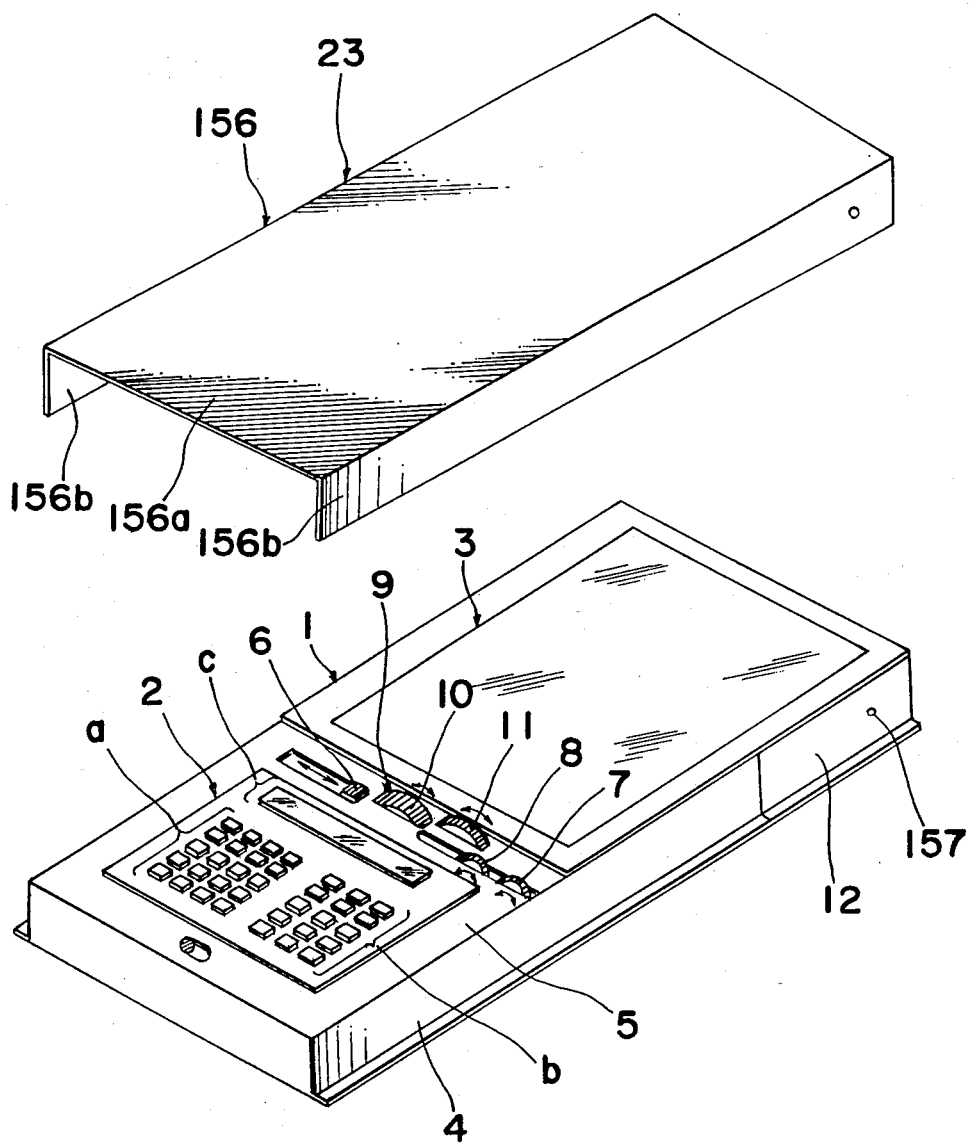
FIG. 1 is a perspective view of a microform-reader according to the present invention.

Before the description of the present invention proceeds, it is to be noted that like parts are designated by like reference numerals throughout the accompanying drawings.

Figure 2:
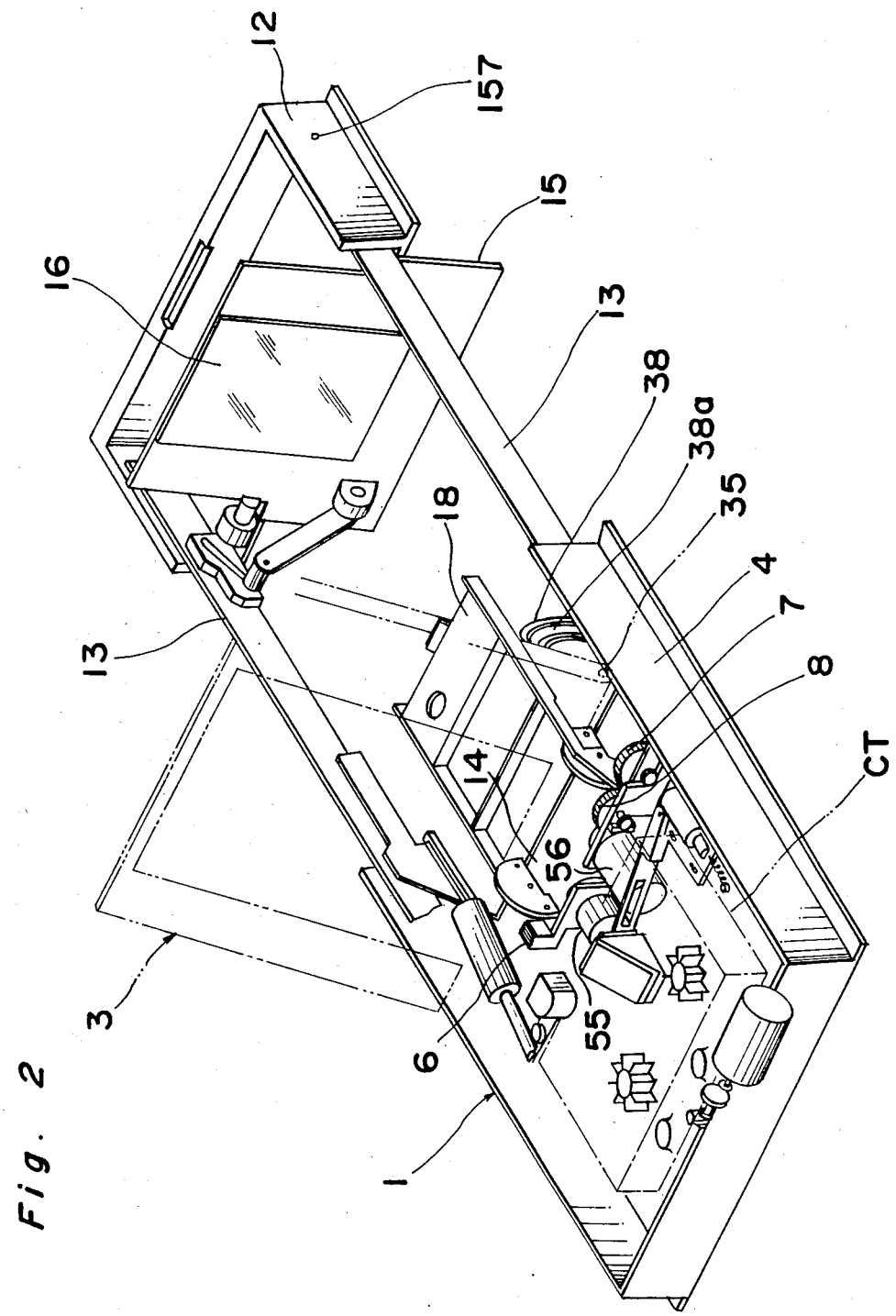
FIG. 2 is a perspective view, on an enlarged scale, of the microform-reader when in use, with a cassette cover removed.

As shown in FIG. 1, a microform-reader embodying the present invention is generally identified by 1 and is, when not in use, folded into a generally rectangular flattened box-like configuration with its top area covered by both a cassette cover 2 and a viewing screen 3, the cassette cover 2 being used to selectively open and close a cassette chamber for accommodating a microfilm cassette CT shown by the phantom line in FIG. 2.

The cassette cover 2 is, in the case where a retrievable microfilm is used, formed as a keyboard including a plurality of data input keys a for the entry of respective data for the retrieval, a plurality of function keys b comprised of a "Rewind" key, an "Advance" key, selector keys for selecting retrieval modes, etc., and a display c for the display of the address of each frame of the microfilm and data for the retrieval.

That portion 5 of the top area of a casing 4 which exteriorly surrounds the cassette cover 2 is provided with a magnification selector knob 6, a horizontal or transverse scanning dial 7 and a vertical or heightwise scanning dial 8, all of which are partially exposed to the outside for the access to an operator's hand finger. In addition, through a generally rectangular opening 9 defined on the top area portion 5 at a location adjacent the viewing screen 3, roulettes 10 and 11 for the focus adjustment of a low magnification projecting lens assembly 55 and a high magnification projecting lens assembly 56, respectively, can be manipulated one at a time.

Figure 4:
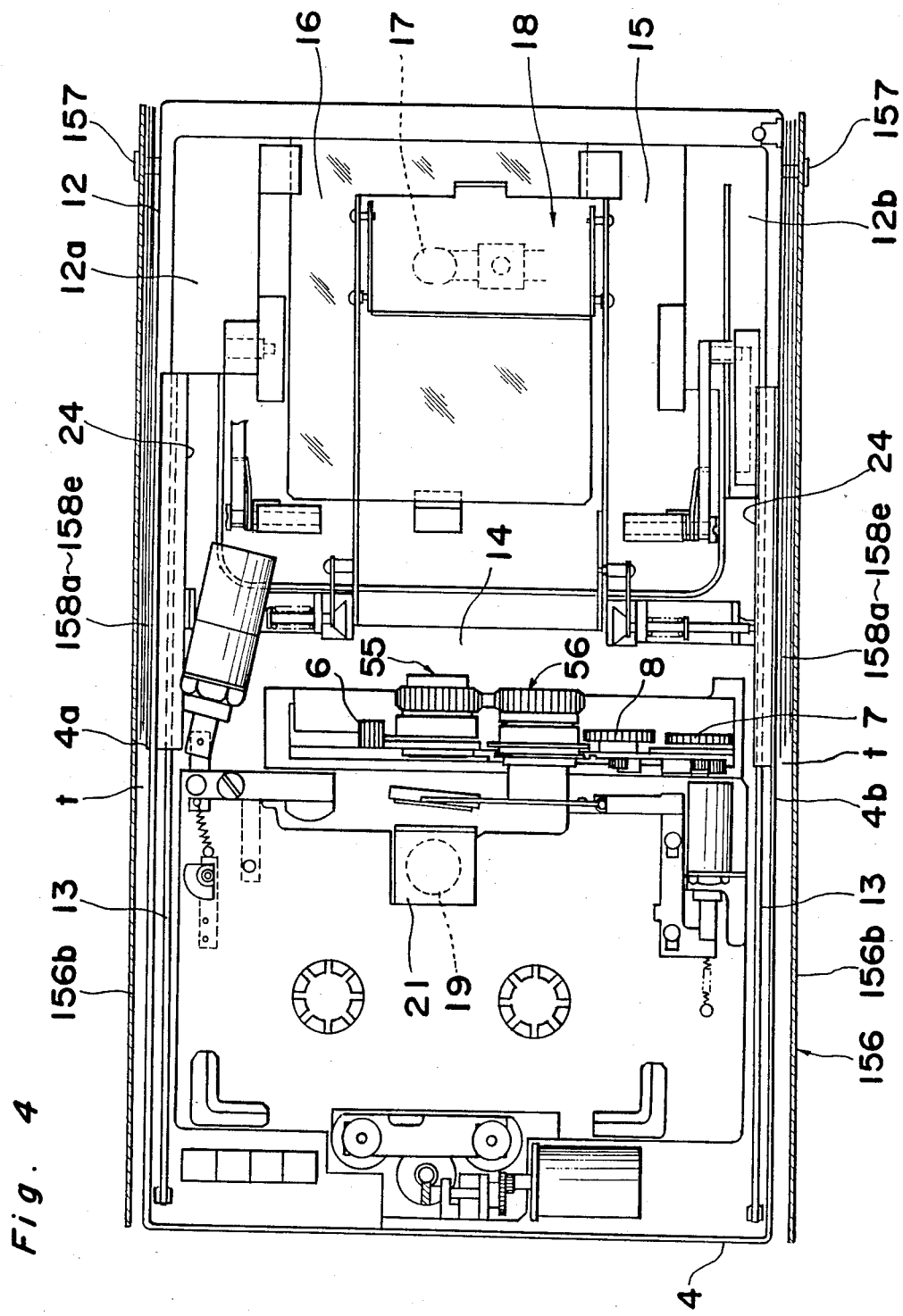
FIG. 4 is a top plan view of the microform-reader when not in use, with both the cassette cover and a screen removed.

FIG. 2 schematically illustrate the structure of the microform-reader 1 during the use thereof. In this condition, a movable member such as a generally U-shaped slide frame 12 is pulled outwards in a direction lengthwise of the casing 4, guided along a pair of spaced slide rails 13. The slide rails 13 secured at one end to the slide frame 12 are, as best shown in FIG. 4, telescopically movably guided by respective rail guides 24 fixed interiorly to associated side walls 4a and 4b of the casing 4. In this construction, when the slide frame 12 in pulled a predetermined distance outwards, a mirror support plate 15 which has been held in position to form a part of the bottom of the casing 4 while covering a bottom opening defined between a bottom wall 14 and the slide frame 12 can be erected so as to form a support leg for the support of the integer. At the same time, a reflecting mirror 16 supported by the mirror support plate 15 is held in position to reflect the incoming imagewise light, i.e., light penetrating from the opposite side of film, towards the viewing screen 3 then uprisen so as to assume a predetermined tilt angle relative to the casing 4.

The optical system employed in the microform-reader 1 according to the present invention will now be described with particular reference to FIG. 3.

Figure 3:
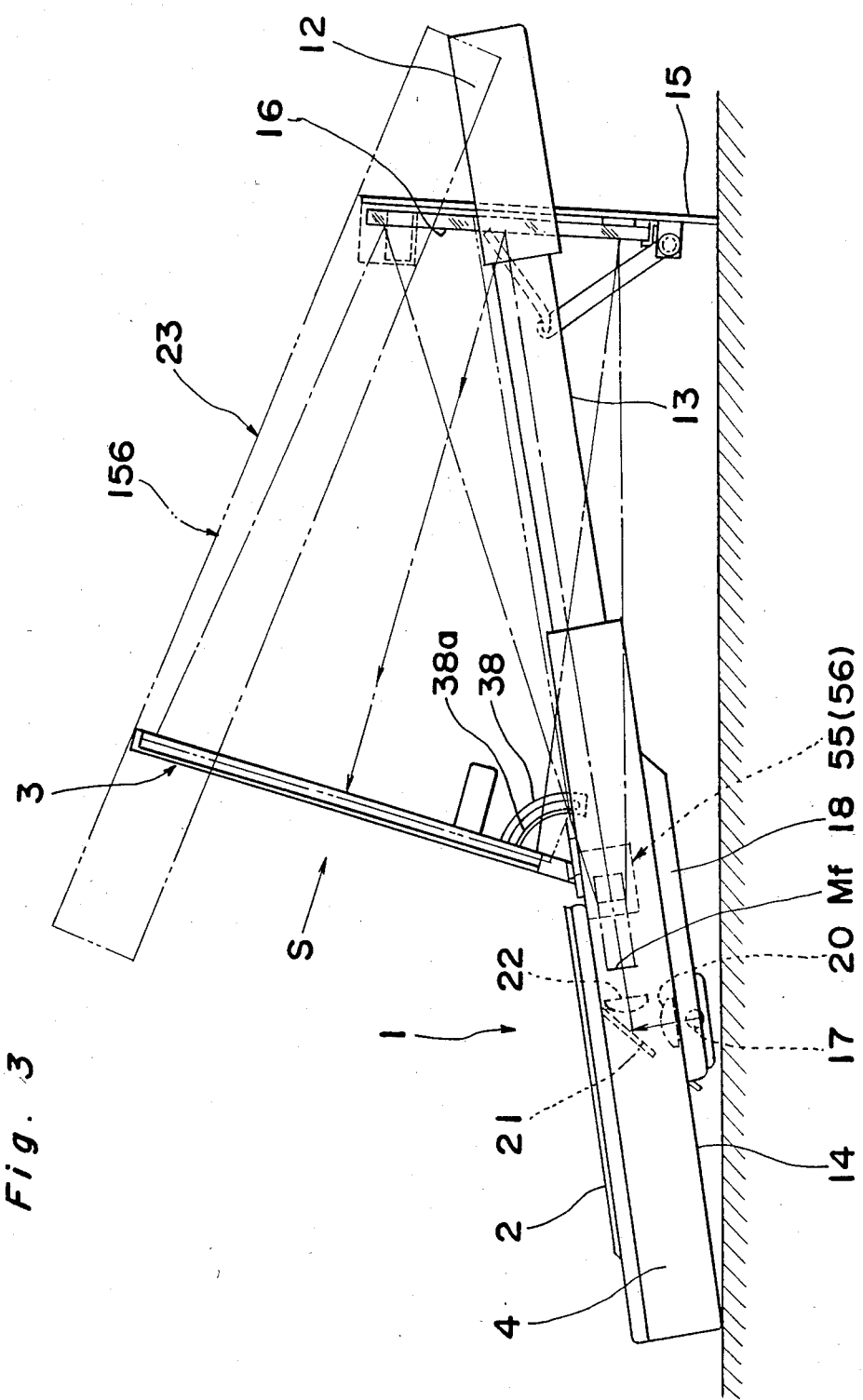
FIG. 3 is a side elevational view of the microform-reader shown in FIG. 2.

As shown in FIG. 3, a lamp holder 18 for the support of a lamp 17 forming a light source is attached exteriorly to and retained by the bottom wall 14 of the casing 4 so that rays of light emanating from the lamp 17 can be collected by a first condenser lens 20, mounted on the bottom wall 14 so as to cover a light hole 19 (FIG. 4) defined in the bottom wall 14 in alignment with the lamp 17, and then directed towards a microfilm Mf after having been deflected 90° by a deflecting mirror 21 and then collimated by a second condenser lens 22. As the collimated rays of light pass through the microfilm Mf, an image on the microfilm Mf is carried thereby and is then passed through either the low magnification projecting lens assembly 55 or the high magnification projecting lens assembly 56. The imagewise light emerging from the lens assembly 55 or 56 is, after having been reflected by the reflecting mirror 16, projected onto the screen 3 from rear, forming the image originally born by the microfilm Mf. The image of the microfilm Mf so projected onto the screen 3 from rear can be viewed from front in a direction as shown by S. It is to be noted that the space between the reflective mirror 16 and the screen 3 may be enclosed by a foldable light-shielding hood to avoid an interference between the imagewise light and the external light so as to increase the contrast of the image reproduced on the screen 3. This light-shielding hood is generally identified by 23 in FIG. 1 and FIGS. 5 and 6 and will be described in detail later.

The screen 3 is pivotally mounted on the top of the casing 4 by means of coaxial stud shafts 37, carried thereby, for angular movement between uprisen and folded positions through a predetermined angular distance determined by the actual length of the arcuate guide slot 38a formed in a guide plate 38. This screen 3 when in the folded position during the non-use of the microform-reader 1 forms a part of the top area of the casing 4.

Figure 5A:
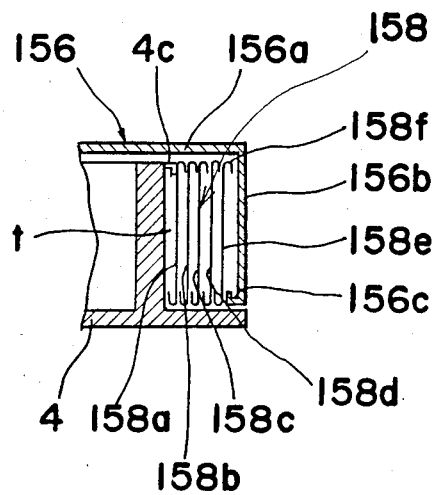
FIGS. 5(a) and 5(b) are transverse sectional views of an essential portion of the microform-reader showing a fold-able light-shielding hood in folded and unfolded positions, respectively.
Figure 5B:
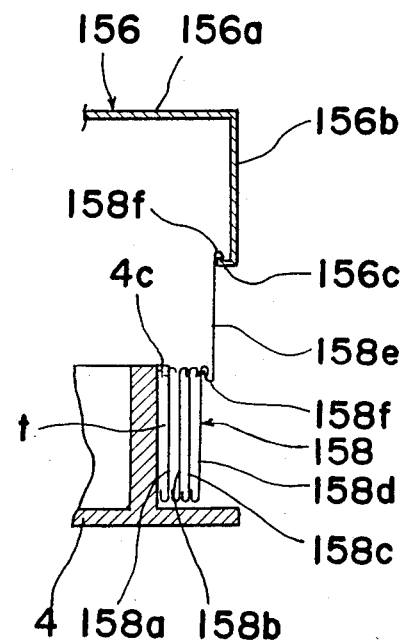

As best shown in FIGS. 1, 5 and 6, the foldable light-shielding hood 23 comprises a generally U-sectioned body 156 including a rectangular top panel 156a of a size sufficient to cover the entire top area of the casing 3 with the slide frame 12 held in the retracted position, and a pair of opposite side panels 156b formed integrally with the respective side edges of the top panel 156a so as to protrude at right angles to such top panel 156a, the opposite side panels 156b being spaced from each other such a distance greater than the width of the casing 3 that a space t can be formed on each side of the casing 3 and between the adjacent side panel 156b and the associated side wall of the casing 3 as indicated in FIGS. 5(a) and 5(b).

Figure 6A:
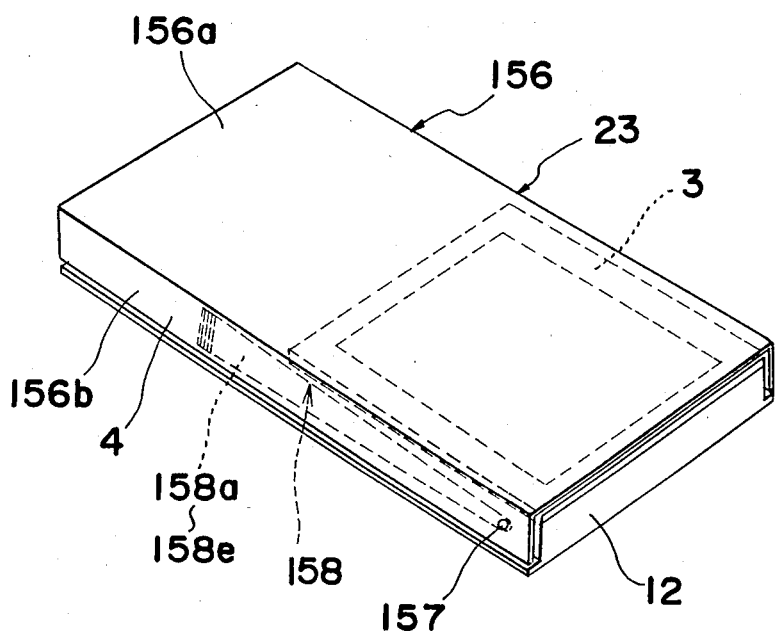
FIGS. 6(a) to 6(c) are perspective views of the microform-reader with the light-shielding hood shown as held in the folded position, an intermediate position and the unfolded position, respectively.

The body 156 is hingedly connected to the slide frame 12 having a pair of hinge pins 157 protruding in the opposite directions outwardly from respective side members of the slide frame 12 and relatively pivotally protruding through the associated side panels 156b. The hood 23 so pivotally supported can be angularly moved between unfolded and collapsed positions about a common axis of the hinge pins 157 as shown in FIGS. 6(c) and 6(a) respectively. Although not shown, a suitable lock means may be employed to retain the body 156 and, hence, the hood 23 in the collapsed position so long as the microform-reader 1 embodying the present invention is not in use.

The hood 23 also comprises a pair of generally sector-shaped, foldable side shields each generally identified by 158 in FIGS. 5 and 6. Each of the side shields 158 is similar in shape to a foldable fan and comprises a plurality of elongated segments 158a to 158e accommodated within the respective space t with the respective hinge pin 157 passing through respective one ends thereof so that all of the segments 158a to 158e for each shield 158 can pivot about the associated hinge pin 157 in a manner as will be described later.

In order for the segments 158a to 158e for each shield 158 to be spread outwardly so as to assume a generally sector shape as shown in FIG. 6(c) in response to the angular movement of the body 156 from the collapsed position, shown in FIG. 6(a), towards the unfolded position shown in FIG. 6(c), about the common axis of the hinge pins 127, each of the segments 158a to 158e for each shield 158 has its opposite side edges crimped in the opposite directions with respect to each other so as to protrude in a direction inwardly of the respective segment thereby forming respective upper and lower hooks generally identified by 158f. Thus, when viewed in a direction perpendicular to the longitudinal sense of each segment 158a to 158e, the respective segment 158a to 158e represents, as best shown in FIGS. 5(a) and 5(b), a generally S-shaped configuration so that when the outermost one 158e of the segments 158a to 158e which is closest to the associated side panel 156b of the hood body 156 is pulled upwards permitting it to pivot about the associated hinge pin 157, all of the segments 158a to 158e can be successively spread with the lower hook 158f of one segment engaged in a generally handshake fashion with the upper hook 158f of the next succeeding segment immediately below such one segment substantially as best shown in FIG. 5(b).

The upper hook 158f of the outermost segment 158e for each shield 158 can be engageable with a mating lower hook 156c formed in the associated side panel 156b at a lower edge portion remote from the top panel 156a whereas the lower hook 158f of the innermost segment 158a closest to the associated side wall of the casing 4 can be engageable with an upper hook 4c in such associated side wall of the casing 4 adjacent the top opening of the casing 4.

Each of the sector-shaped shields 158 is so sized that, when the associated segments 158a to 158e are spread, having pivoted about the associated hinge pin 157 as shown in FIG. 6(c), the free ends of such associated segments 158a to 158e can terminate laterally of a respective side frame of the screen 3.

Hereinafter, the manner by which the shields 158 are spread will be described with particular reference to FIGS. 6(a) to 6(c).

Assuming that the microform-reader 1 is not in use and, therefore, the hood body 156 is in a closed position laid generally flat against the casing 4 as shown in FIG. 6(a), the segments 158a to 158e are accommodated within the respective spaces t between the side panels 156b and the side walls of the casing 4 while folded together as best shown in FIG. 5(a).

Figure 6B:
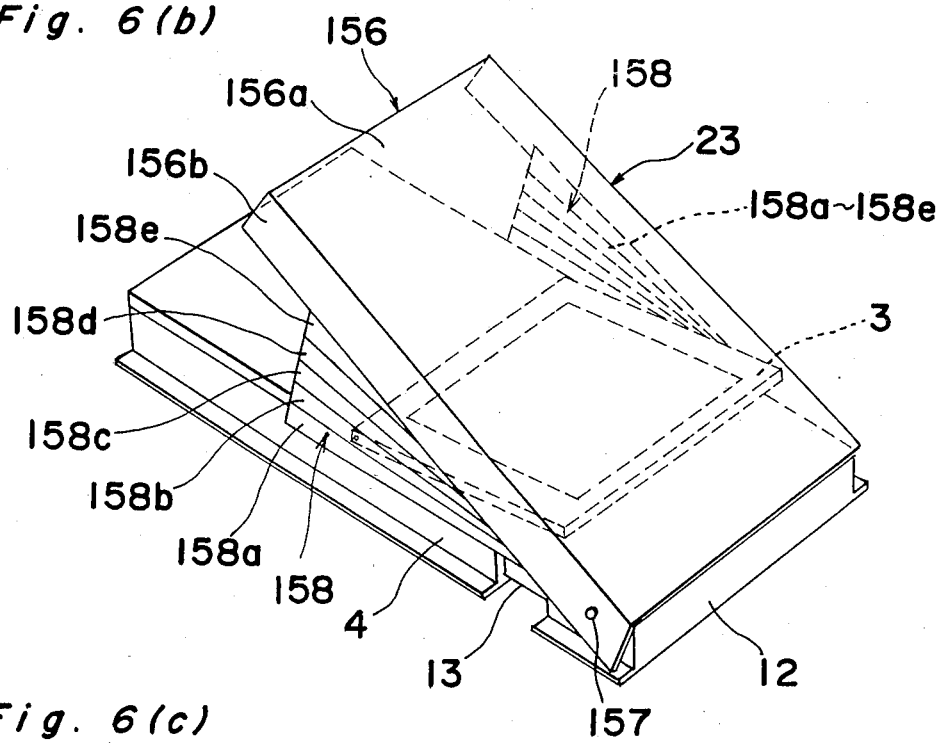
Figure 6C:
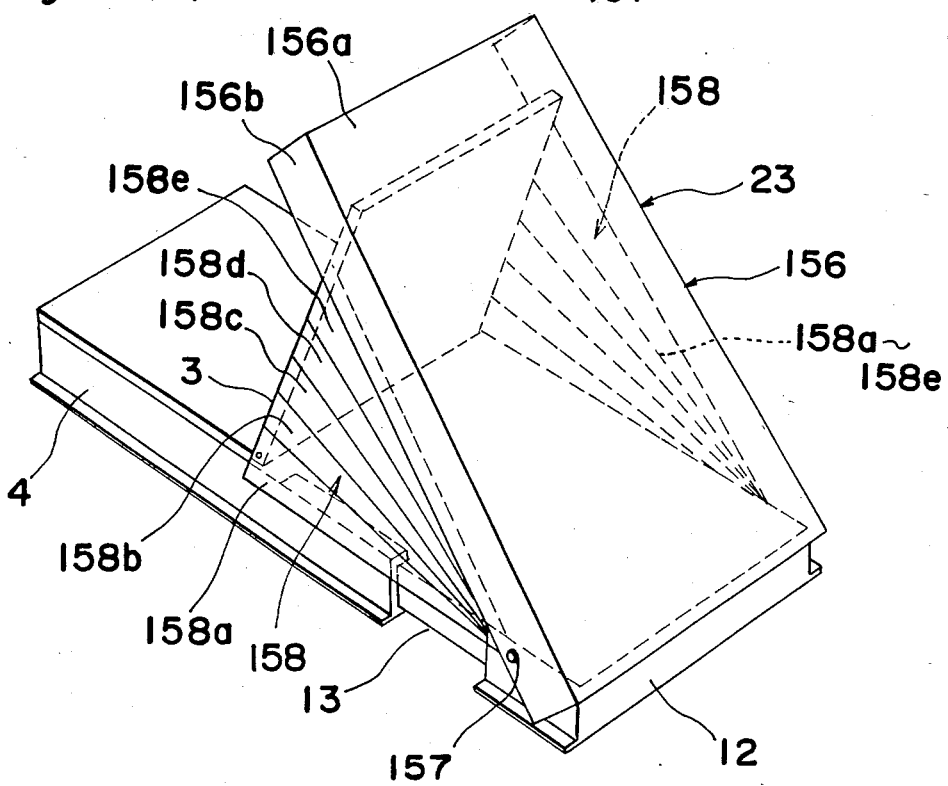

When the slide frame 12 is subsequently pulled outwards towards the extended position, the reflecting mirror 16 and the screen 3 (both shown in FIG. 2) are automatically pivoted towards the upright position and the uprisen position, respectively, in response to the movement of the slide frame 12 towards the extended position as shown in FIG. 6(b). As the screen 3 is so pivoted from the folded position towards the upright position, the hood body 156 is pivoted about the hinge pins 157 from the closed position towards an opened position with an upper edge of the mirror support plate 15 held in sliding contact with the top panel 156a, accompanied by the pivotal movement of the segments 158a to 158e about the associated hinge pins 157. This is possible because, as the hood body 156 is so pivoted towards the opened position, the hooks 156c at the side panels 156b are brought into engagement with the upper hooks 158f of the outermost segments 158e, respectively, thereby successively lifting the remaining segments 158b to 158e while permitting them to pivot about the hinge pins 157 as best shown in FIG. 5(b).

When and after the hood body 156 has been completely moved to the opened position with the screen 3 and the mirror 16 arriving at the uprisen and upright positions, respectively, the segments 158a to 158e are spread or unfolded to assume a generally sector shape as shown in FIG. 6(c) thereby closing generally triangular side openings each delimited by the hood body 156, the screen 3 and the casing 4. At this time, a front end portion of the hood body 156 remote from the hinge pins 157 protrudes frontwardly of and over the screen 3 in the uprisen position thereby serving as a visor.

The procedure reverse to that described above results in the folding of the segments 158a to 158e with the hood body 156 brought to the closed position. More specifically, when the slide frame 12 is pushed towards the retracted position accompanied by the return movement of the reflecting mirror 16 and the screen 3 towards the laid-down position and the folded position, respectively, the hood body 156 is also pivoted counter-clockwise as viewed in FIG. 6 with the segments 158a to 158e consequently successively folded together into the respective spaces t.

Although the present invention has been described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. In a microform-reader in which an optical system is utilized for projecting on a screen a magnified reproduction of an image on a microfilm, said microform-reader comprising a casing; a moveable member supported by the casing for movement between retracted and extended positions; a viewing screen mounted on and supported by the casing for movement between folded and raised positions; an optical system for projecting the image onto the screen; a lamp for illuminating the image onto the screen; a reflecting mirror member supported for movement between laid-down and upright positions; and a foldable light-shielding hood provided for enclosing a space defined between the screen and the mirror member when said screen and said mirror member are held in the raised position and the upright position, respectively, the improvement wherein said foldable light-shielding hood comprises a generally rectangular hood body hinged at one end to the movable member for pivotal movement between closed and opened positions and a pair of generally sector-shaped, foldable side shields, each comprised of a plurality of side by side elongated foldable segments pivotally connected to said movable member for commonly pivoting about the pivot axis of the hood body, means extending along the length of the top and bottom edges of said folded side by side segments for effecting light sealing engagement between a bottom edge of one segment and the top edge of an adjacent segment and for causing automatically said segments for each side shield to unfold in sequence to assume a generally sector shape in response to the movement of the hood body from the closed position to the opened position thereby closing off a generally triangular opening delimited by the screen, the casing and the hood body.

2. A microform-reader as claimed in claim 1, wherein each of the segments for each side shield has its opposite top and bottom edge portions crimped in laterally opposite directions with respect to each other so as to bend inwardly thereof to provide upper and lower handshake engaging hooks.

* * * * *